J. F. HESS.
MACHINE FOR FORCING AIR INTO VESSELS CONTAINING LIQUIDS.
No. 190,215. Patented May 1, 1877.
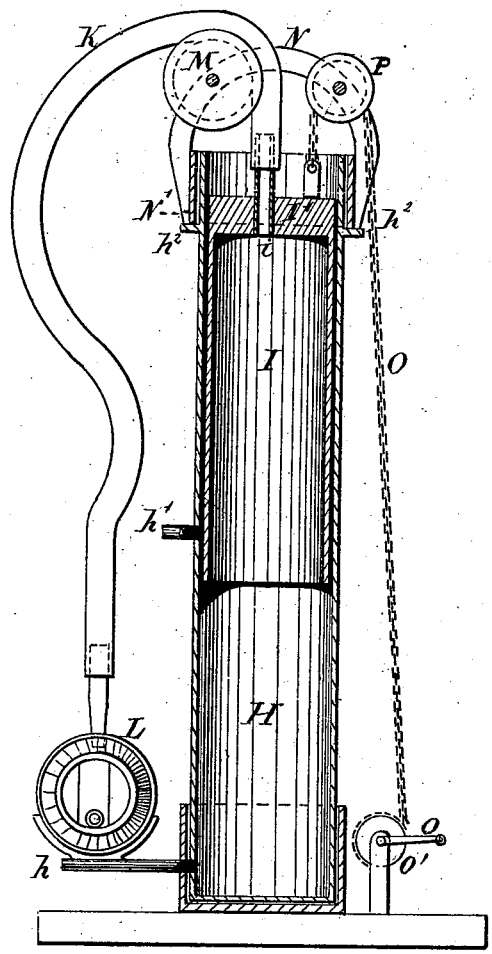
Witnesses
Henry Orth
H. A. S. Bliss
Inventor.
Jacob F. Hess
by Abbott & Co attys

UNITED STATES PATENT OFFICE.

JACOB F. HESS, OF MASSILLON, OHIO.

IMPROVEMENT IN MACHINES FOR FORCING AIR INTO VESSELS CONTAINING LIQUIDS.

Specification forming part of Letters Patent No. 190,215, dated May 1, 1877; application filed June 30, 1876.

*To all whom it may concern:*

Be it known that I, JACOB F. HESS, of Massillon, county of Stark and State of Ohio, have invented a certain new and useful Improvement in Apparatus for Compressing Air, which improvement is fully set forth in the following specification and accompanying drawing, which is a vertical section of my machine.

H is a cylindrical water-tank, provided with an overflow-pipe, $h$, and a second pipe, $h^1$, through which the tank may be emptied. I is a cylindrical air-receiver and compressor, of less diameter than tank H, and about half as high. The upper end of tank I is closed by a head, $l'$, except a small pipe, $i$. K is a flexible pipe or hose, leading from pipe $i$ to a barrel, L, containing beer or other liquid, into which it is desired to force air. N is an arch or a bracket, the ends or legs of which are secured to a ring, N', which rests upon a flange or lugs, $h^2$, attached to cylindrical tank H near its upper end.

In practice I prefer to employ two of these brackets placed a short distance apart, and between them I mount upon pins or shafts two grooved pulleys, M P. The flexible tube K passes over one of these pulleys.

O is a lifting-chain, one end of which is attached to the upper end of tank I, the other end being connected with a windlass, $o$ $o'$.

The operation of the device is as follows: Tank H is filled with water up to the overflow-pipe $h^1$, the tank or compressor I being lifted high enough to insure that its lower end shall be raised above the water, so that it (the compressor) shall be filled with air. The chain O being now loosened or released the weight of tank I compresses the air contained within it, and forces it into the barrel L.

When all the air, or any portion of it, has been expelled from tank I it may be raised by means of the windlass and chain, and again filled with air.

When desired, stop-cocks may be placed in the top or head I' and in the delivery-pipe K, to regulate the passage of the air.

What I claim is—

1. The herein-described apparatus for compressing air, consisting of the water-tank H, the air-compressing tank I, the flexible tube K, chain O, and pulleys M P, substantially as set forth.

2. The water-tank H, provided with supports $h^2$, in combination with the ring N' and arch N, substantially as set forth.

3. The water-tank H provided centrally with the overflow-pipe $h^1$, the upper part of the tank serving as a support for pulleys M P, substantially as set forth.

In testimony that I claim the foregoing as my own I affix my signature in presence of two witnesses.

JACOB F. HESS.

Witnesses:
P. S. SOWERS,
GEO. W. RAFF.